Patented Mar. 24, 1925.

1,530,511

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

PROCESS OF MAKING OLEOMARGARINE.

No Drawing.    Application filed April 23, 1924. Serial No. 708,570.

*To all whom it may concern:*

Be it known that I, CHARLES E. NORTH, a citizen of the United States, residing at Montclair, county of Essex, and State of New Jersey, have invented certain new and useful Improvements in Processes of Making Oleomargarine, of which the following is a full, clear, and exact description.

The marketable value of oleomargarine or other butter substitutes depends in large measure upon their similarity in texture and physical appearance to natural butter, but the conversion of beef tallow or other fats used for such purposes into a granular mass having the predominant characteristics of butter is a problem involving a number of difficulties. The purification of such fats requires them to be melted into an oil. Their conversion into a substance resembling butter also makes it necessary to melt them at temperatures which reduce them to the condition of homogeneous oils.

Various expedients have been practiced for converting such oils into butter substitutes having the granular texture characteristics of natural butter, one of which involves the use of emulsifying machines as the first step, to produce an emulsion of the fat globules. It has, however, been found that while the oil can be reduced to the condition of small fat globules by the use of mechanical emulsifying machines, the fat percentage of such emulsions is low, far below, in fact, the fat percentage of 80% characteristic of ordinary butter.

In the butter industry the fat concentration in cream which is to be churned is universally accepted as not greater than 35%, and in producing emulsions of other fats this percentage has, in consequence, been adopted in all attempts to churn such fats where the same processes are followed as in the churning of cream to make butter. But, by reason of the differences in the melting point, the hardness of these other fats and the failure of emulsifying machines to produce fat globules of uniform size, ordinary churning processes have not proved commercially successful in effecting agglomeration of fat globules into masses having the texture and the appearance of natural butter.

Another expedient adopted by the manufacturers of oleomargarine and other butter substitutes in order to secure the texture characteristic of natural butter, has been to direct fine streams or jets of hot melted fat into cold water or cold skim milk, which results in the congealing of such streams into solid threads or strings which, when pressed together, give a texture somewhat resembling that of butter.

My present invention resides in an improved method of making oleomargarine or other butter substitutes which have all the characteristics of natural butter without the use of any churning and in a very simple and economical manner. This consists in melting fat or, preferably, a mixture of milk fat or oil and such other fat as may be used until it is brought to the condition of a homogeneous oil, and then emulsifying this oil. By this means I have found that the fat concentration of such emulsions may be greatly in excess of the 35% or that which has heretofore been adopted as the standard, and in fact may be above 60%.

My object in making the fat concentrations as high as possible is to bring the surfaces of the fat globules closer together than they are in ordinary creams. By my processes of emulsification I am enabled to produce fat globules of approximately the same dimensions as those found in normal milk and cream, so that the space occupied by such globules in any receptacle when they are so crowded together that their surfaces are in actual contact, is 80% of the entire space, the remaining 20% being accounted for by the space between the globules. I therefore produce emulsions of fat of such high concentration that the globules are very much closer together than they are in ordinary cream or emulsions of only 35% concentration.

I have discovered that melted beef fat in my process of making oleomargarine may be quickly and easily emulsified in either of two general ways. I may, for example, add to the melted fat a relatively small amount of dry skim milk powder and by simple mixing followed by the addition of small quantities of water, a thick paste emulsion is formed containing a fat concentration of more than 60%. Or I may mix with the melted fat milk or milk fluid in the proportions of 60% or more of the fat and 40% or less of the milk fluid, and pass this mixture through an ordinary emulsifying machine with the resulting production of thick emulsion.

In either case the viscosity of the concentrated emulsion is greatly increased on cooling, owing to the congealing of the fat. As the temperature approaches 55% the fat changes from a liquid to a semi-solid or waxy form in which condition the fat globules have a tendency to agglomerate if brought into contact and they may be readily brought into such contact by the application of simple pressure or squeezing. It is only necessary, therefore, to place the emulsion in a vessel surrounded by cold water and to stir or rub the same as the temperature goes down to 55° F. to produce a mass of fat having the same granular texture that is characteristic of butter, such agglomeration being attended by the discharge of most of the buttermilk or water. The mass may then be worked, flavored or salted in the same way practiced in the making of butter.

It is desirable, of course, that any butter substitute should have as much of a butter flavor as possible, and hence in carrying out this process I use milk oil in addition to the beef or other fat, not only on account of the better flavor which it imparts, but for the purpose of reducing the melting point of the fat in the mixture. Specifically described, the process is as follows:

I bring together 80 parts of beef tallow or beef fat and 20 parts of milk or butter fat and melt them until they are transformed into a homogenous oil. To 7 parts of this oil I then add 1 part of dry skim milk powder and in a jacketed vessel which keeps the temperature above 100° F. the two are stirred by any ordinary means until thoroughly mixed. Continuing the stirring 3 parts of warm water are gradually added until a thick paste emulsion is formed. It is obvious that the fat concentration of the emulsion will be between 60% and 70%.

The mixture is then gradually cooled to between 65° and 55° F. within which range the paste will have become much more viscous and stiff by the change of the fat globules from a liquid to a semi-solid form. When in this condition simple pressure or squeezing by means of a paddle or roller will cause the globules to stick together and agglomerate and the excess butter milk to be discharged, whereupon the mass may be washed, salted and worked as is done in ordinary butter making. The time required to transform the chilled paste into a substance resembling butter is only a few minutes.

As another way of producing the emulsion I may combine 6 parts of the melted fat mixture with 4 parts of milk fluid, under which term I include any milk, natural or artificial, and pass this mixture through an emulsifying machine, with the result that a thick viscous fluid is produced. Such an emulsion may then be treated in the manner above described to produce the final product.

Other fats than beef tallow or fat have been adopted in this industry for the manufacture of butter substitutes, but so far as I have observed these may be treated in the same way with the same results.

What I claim is:

1. The process herein set forth, of making butter substitutes which consist in melting the fat employed to the condition of a homogeneous oil, forming an emulsion of high fat concentration of such oil with the emulsifying ingredients of milk, cooling the emulsion to a temperature at which the fat globules have a tendency to agglomerate and at such temperature bringing the said globules by simple pressure or squeezing into contact with one another.

2. The process herein set forth, of making butter substitutes which consists in bringing together milk oil and a suitable fat, melting the mixture to form a homogeneous oil, forming an emulsion of high fat concentration of such oil and the emulsifying ingredients of milk, cooling the emulsion to a temperature at which the fat globules have a tendency to agglomerate and at such temperature producing their agglomeration by simple pressure or squeezing.

3. The process herein described, of making butter substitutes which consists in heating the fats employed to a temperature sufficient to convert them into a homogeneous oil, forming with such oil and the emulsifying ingredients of milk an emulsion of a fat concentration over 60%, stirring and cooling the same to a temperature below 60° F. and causing an agglomeration of the fat particles at such temperature by pressure or squeezing.

In testimony whereof I hereto affix my signature.

CHARLES E. NORTH.